United States Patent
Crowther (10) Patent No.: US 10,855,661 B2
(45) Date of Patent: Dec. 1, 2020

(54) DYNAMIC CRYPTOGRAPHIC POLYMORPHISM (DCP) SYSTEM AND METHOD

(71) Applicant: KASADA PTY LTD, North Sydney (AU)

(72) Inventor: Samuel John Crowther, Valentine (AU)

(73) Assignee: KASADA PTY, LTD., North Sydney (AU)

( * ) Notice: Subject to any disclaimer, the term of this patent is extended or adjusted under 35 U.S.C. 154(b) by 6 days.

(21) Appl. No.: 15/555,466

(22) PCT Filed: Jun. 9, 2016

(86) PCT No.: PCT/AU2016/050462
§ 371 (c)(1),
(2) Date: Sep. 1, 2017

(87) PCT Pub. No.: WO2017/063031
PCT Pub. Date: Apr. 20, 2017

(65) Prior Publication Data
US 2018/0041478 A1    Feb. 8, 2018

(30) Foreign Application Priority Data
Oct. 16, 2015 (AU) .................................. 2015904242

(51) Int. Cl.
*H04L 29/06* (2006.01)
*H04L 9/32* (2006.01)
(Continued)

(52) U.S. Cl.
CPC .......... *H04L 63/0428* (2013.01); *G06F 21/44* (2013.01); *H04L 9/3236* (2013.01);
(Continued)

(58) Field of Classification Search
CPC combination set(s) only.
See application file for complete search history.

(56) References Cited

U.S. PATENT DOCUMENTS 6,170,014 B1 * 1/2001 Darago .................... G06F 21/10
                                                709/229
6,263,446 B1 * 7/2001 Kausik ................ G06F 21/6245
                                                380/259
(Continued)

FOREIGN PATENT DOCUMENTS

EP          2512091 A1    10/2012

OTHER PUBLICATIONS

Alfred J. Menezes, Paul C. van Oorschot, Scott A. Vanstone, "Handbook of applied cryptography", 1997, ISBN: 0849385237.*
(Continued)

*Primary Examiner* — Piotr Poltorak
(74) *Attorney, Agent, or Firm* — James F. Goedken, Esq.

(57) ABSTRACT

Described herein is a method of enhancing the security of an internet transaction which includes the transmission of structurally formatted information, the method including the steps of: transmitting a request for the structurally formatted information across a network environment; receiving the request and sending a formulated response requiring calculation and decoding to determine the nature and content of the structurally formatted information; and receiving the structurally formatted information.

2 Claims, 7 Drawing Sheets

(51) Int. Cl.
*G06F 21/44* (2013.01)
*H04L 29/08* (2006.01)

(52) U.S. Cl.
CPC ............ *H04L 9/3271* (2013.01); *H04L 63/14* (2013.01); *H04L 63/1458* (2013.01); *H04L 67/02* (2013.01)

(56) References Cited

U.S. PATENT DOCUMENTS

| | | | | |
|---|---|---|---|---|
| 6,308,273 | B1* | 10/2001 | Goertzel | G06F 21/6218 726/2 |
| 6,944,663 | B2 | 9/2005 | Schuba | |
| 7,647,622 | B1* | 1/2010 | Sobel | H04L 63/1425 709/229 |
| 8,484,741 | B1* | 7/2013 | Chapman | G06Q 10/0635 726/25 |
| 9,231,949 | B1* | 1/2016 | Jenkins | H04L 63/0807 |
| 10,387,980 | B1* | 8/2019 | Shahidzadeh | G06Q 40/02 |
| 2002/0108050 | A1* | 8/2002 | Raley | G06F 21/10 713/193 |
| 2003/0172159 | A1 | 9/2003 | Schuba | |
| 2003/0226017 | A1* | 12/2003 | Palekar | H04L 63/0428 713/168 |
| 2004/0093499 | A1* | 5/2004 | Arditi | H04L 9/3247 713/176 |
| 2005/0177867 | A1* | 8/2005 | Toutonghi | G06F 21/31 726/7 |
| 2006/0053206 | A1* | 3/2006 | Hirose | G06Q 10/107 709/206 |
| 2007/0033642 | A1* | 2/2007 | Ganesan | H04L 63/0428 726/10 |
| 2007/0260670 | A1* | 11/2007 | Chang | G06F 9/542 709/203 |
| 2008/0040484 | A1* | 2/2008 | Yardley | H04L 67/02 709/227 |
| 2008/0209524 | A1* | 8/2008 | Almog | H04L 63/0281 726/4 |
| 2008/0270520 | A1* | 10/2008 | Reid | H04L 63/168 709/203 |
| 2009/0013381 | A1* | 1/2009 | Torvinen | H04L 9/0838 726/3 |
| 2009/0106393 | A1* | 4/2009 | Parr | H04L 63/0428 709/218 |
| 2009/0216795 | A1* | 8/2009 | Cohen | G06F 21/6218 |
| 2010/0030990 | A1* | 2/2010 | Asai | G06F 21/6209 711/163 |
| 2010/0174900 | A1* | 7/2010 | Lin | G06Q 20/12 713/155 |
| 2011/0016381 | A1* | 1/2011 | Cahill | G06F 11/3017 715/234 |
| 2011/0225089 | A1* | 9/2011 | Hammad | G06Q 20/3552 705/44 |
| 2011/0231913 | A1 | 9/2011 | Feng | |
| 2011/0289599 | A1* | 11/2011 | Evenden | H04L 63/0823 726/29 |
| 2013/0268679 | A1* | 10/2013 | Asano | G06F 21/10 709/226 |
| 2013/0339526 | A1* | 12/2013 | Ruellan | H04L 67/2814 709/226 |
| 2014/0244764 | A1* | 8/2014 | Lassen | H04L 67/40 709/206 |
| 2014/0310185 | A1* | 10/2014 | Staflin | H04L 63/18 705/71 |
| 2014/0373160 | A1* | 12/2014 | Shigemoto | G06F 21/577 726/25 |
| 2014/0373161 | A1* | 12/2014 | Hudson | H04L 63/1433 726/25 |
| 2015/0096001 | A1* | 4/2015 | Morikuni | H04L 63/08 726/7 |
| 2015/0350210 | A1* | 12/2015 | Thibadeau, Sr. | G06F 21/31 726/7 |
| 2016/0127407 | A1* | 5/2016 | Mankovskii | H04L 63/1433 726/1 |
| 2017/0070497 | A1* | 3/2017 | McCallum | H04L 9/3226 |
| 2019/0182160 | A1* | 6/2019 | Bengough | H04L 45/38 |

OTHER PUBLICATIONS

Yu et al., "One-way Hash Function Construction Based on Chaotic Coupled Map Network", IEEE 978-0-7695-4560-8/11, 2011.*
Khor, S. H., 'Deployable Mechanisms for Distributed Denial-of-Service (DDoS) Attack Mitigation', PhD Thesis, University of Tokyo, Mar. 24, 2010 [online], [retrieved from internet on Aug. 1, 2016] URL: http://repository.dEitc.u-tokyo.acjp/dspace/bitstream/2261/38146/1/46-067Kho.pdf.
International Search Report for PCT/AU2016/050462 dated Aug. 9, 2016, 3 pages.
European Extended Search Report issued in EP16854635.6, dated Apr. 12, 2019, 7 pages.

* cited by examiner

DYNAMIC CRYPTOGRAPHIC POLYMORPHISM (DCP) SYSTEM AND METHOD

PRIORITY CLAIM

This application is a 371 National Stage Application of International Application No. PCT/AU2016/050462, filed Jun. 9, 2016, the disclosure of which are incorporated by reference herein in their entireties.

TECHNICAL FIELD

The present description relates to the field of Internet transactions, and in particular discloses the malware resistant processing of Internet based queries.

BACKGROUND OF THE DISCLOSURE

Any discussion of the background art throughout the specification should in no way be considered as an admission that such art is known or forms part of common general knowledge in the field.

Malicious attacks on websites often take the form of controlled continuous queries by malware software that may have infected a third party's computer device.

This can include the constant sending of form based responses in an attempt to guess passwords and discover vulnerabilities in web based systems.

Many systems have been built to counter such attacks through the monitoring of. One such system is that marketed by Shape Security and disclosed at: https://www.shapesecurity.com/product/-Section3. Polymorphism.

SUMMARY OF THE DISCLOSURE

The current disclosure provides an enhanced secure internet query transaction processing system.

In accordance with one aspect of the present disclosure, there is provided a method of enhancing the security of an internet transaction which includes the transmission of structurally formatted information, the method optionally including the steps of: transmitting a request for the structurally formatted information across a network environment; receiving the request and sending a formulated response requiring calculation and decoding to determine the nature and content of the structurally formatted information; receiving the structurally formatted information.

In some embodiments, the structurally formatted information comprises form data. The formulated response can comprise a seed having a series of missing elements and an answer, with the calculation and decoding including determining the missing elements. The complexity of the formulated response can be altered in accordance with the perceived risk of insecurity of the network.

In accordance with another aspect of the present disclosure, there is provided a system providing enhancement against malicious attack over a network, the system typically including: a client-side computer and a server-side computer interconnected over a network; the client-side computer typically despatching a first message request for structured information to the server-side computer; and the server-side computer providing the structured information to the client-side computer in the form of a formulated response preferably requiring one or more calculations and one or more decodings by the client-side computer in order to determine the structured information.

In accordance with a further aspect of the present disclosure, there is provided, in an internet query and answer environment, an example where a server may accept structured queries from an externally located client over a network, a method of rate limiting the submission of valid data over the network, the method preferably including the optional steps of (a) receiving a first structured query request from the client over the network; (b) providing an encrypted answer in response to the request, the encrypted answer preferably requiring the exercise of a computational resource of a first expected level by the client to determine an answer by the client; (c) receiving a second response to the encrypted answer and determining if the second response preferably can include a correct answer; and (d) upon receipt of a correct answer, processing the second response as a valid response.

In some embodiments, the step (d) thriller can comprise, when the second response preferably can include an incorrect answer, flagging the client as a suspect client for receipt of future requests. In some embodiments, the encrypted answer requires the exercise of a computational resource, involving the calculation of the answer to a one way hash function. The calculation preferably can include attempting successive integers in the solution of the one way hash function. The server may adjust the level of exercise of the computational resource in response to the load of first structured query requests received by the server.

BRIEF DESCRIPTION OF THE DRAWINGS

Preferred embodiments of the present disclosure are described with reference to the accompanying drawings in which.

DESCRIPTION OF PREFERRED AND OTHER EMBODIMENTS

In the preferred embodiments, there is provided a method and system for reducing the ability for malware to attack a given website through the utilization of a polymorphic protocol.

The protocol, denoted a Dynamic Cryptographic Polymorphism (DCP), combines traditional polymorphism of web forms and Application Programming Interface (API)

endpoints, with the addition of a cryptographic challenge to be solved, in order for form data to be successfully submitted to a web server.

Whilst many different scenarios are envisaged, one example of how a DCP works will now be described.

Figure 1:
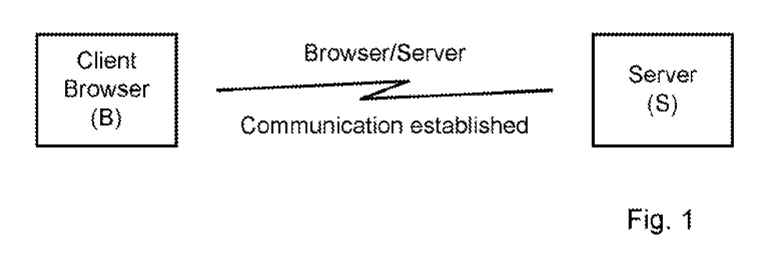
FIG. 1 illustrates an example client server interaction.
Figure 2:
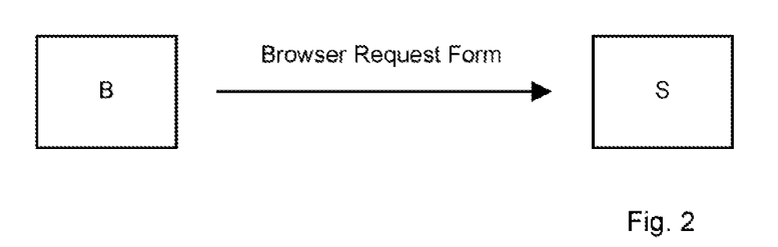
FIG. 2 illustrates an example of a dispatch of a first request for information.

FIG. 1 illustrates a typical client server architecture, wherein a client 1 and server 2 communicate over an insecure network. A transaction, such as a login request, proceeds by the following steps:

1. In FIG. 2, the User of the Browser requests 3 a login page from Server S.

Figure 3:
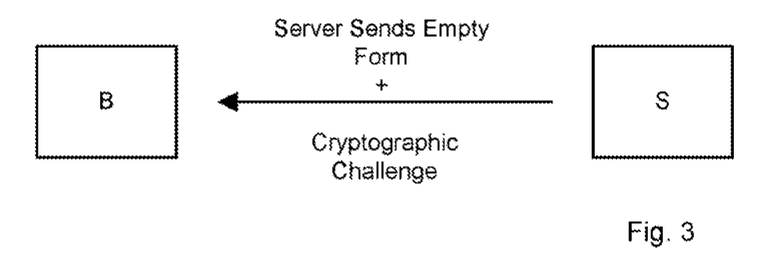
FIG. 3 illustrates an example of a server dispatching a decodable problem to the client.

2. Instead of the normal response of form data, as illustrated in FIG. 3, the Browser, in this example, is sent the seed of '6987236471826498' and the answer of '0d001257bd36d459065f72631e97534e' by the Server S.

3. Given a seed and answer, the Browser is then preferably required to complete the cryptographic hash problem by generating numbers, combining them with the seed and performing a hash function, which may occur in a loop. If the browser finds the number that, when combined with the seed produces the same hash, it can fill out the relevant form field names to submit to the server. In this way, the server has the ability to control the level of computational processing required by the browser side resources before an answer can be provided.

Figure 4:
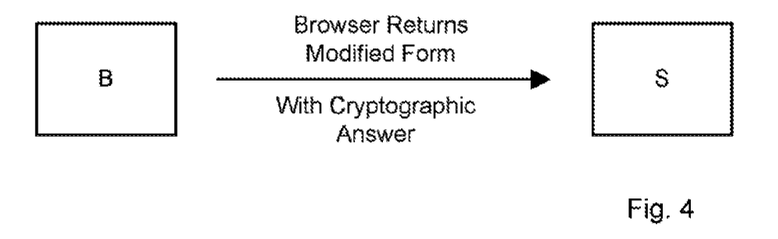
FIG. 4 illustrates an example of a client dispatching form data in a correct format.
Figure 5:
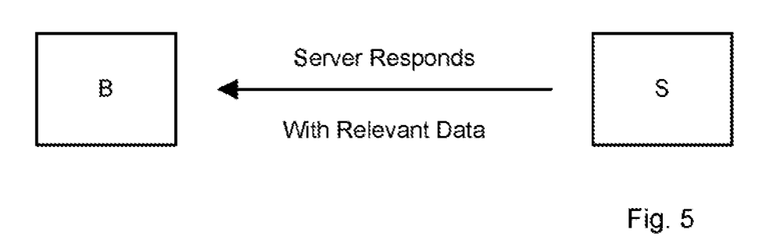
FIG. 5 illustrates an example of a server responding to a correct answer.

4. After performing the calculations described above, as illustrated in FIG. 4, the browser will then be able to submit the forms correctly (as illustrated in FIG. 5) as the browser has determined the answer (which in this example is '9').

The process is preferably repeated for other data input with a different seed and a different answer, typically each time requiring a corresponding calculation by the client.

Figure 6:
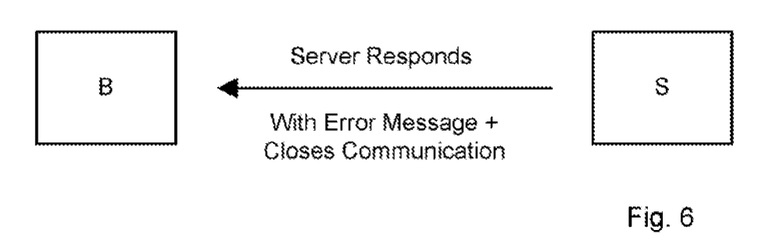
FIG. 6 illustrates an example of a server responding to an incorrect answer.

If the browser requests are being driven by malware control, the malware is unable to pre-empt the required field names, in order to submit the data successfully in the background. Accordingly, the server optionally responds with an error message and preferably closes communication, as illustrated in FIG. 6. This means the malware would have to legitimately request the web form and figure out how to solve that particular challenge before submitting. This may require a significant increase in the complexity of encoding of the intelligence to be built into the malware.

Further, the difficulty of the challenge can be scaled up, in the event of a brute force attack, to allow legitimate requests to get through and severely hinder brute force attacks, without being too computationally expensive on the defenders side.

The DCP can be offered as a software development kit (SDK) for any appropriate programming language. This allows for the utilisation of 'engineers as a service' to help install and use the DCP system continually, preferably on a licensed basis.

In the same or another embodiment, there is provided a more detailed illustration of a resilient html serving of web pages that are significantly resilient to denial of service type attacks.

Figure 7:
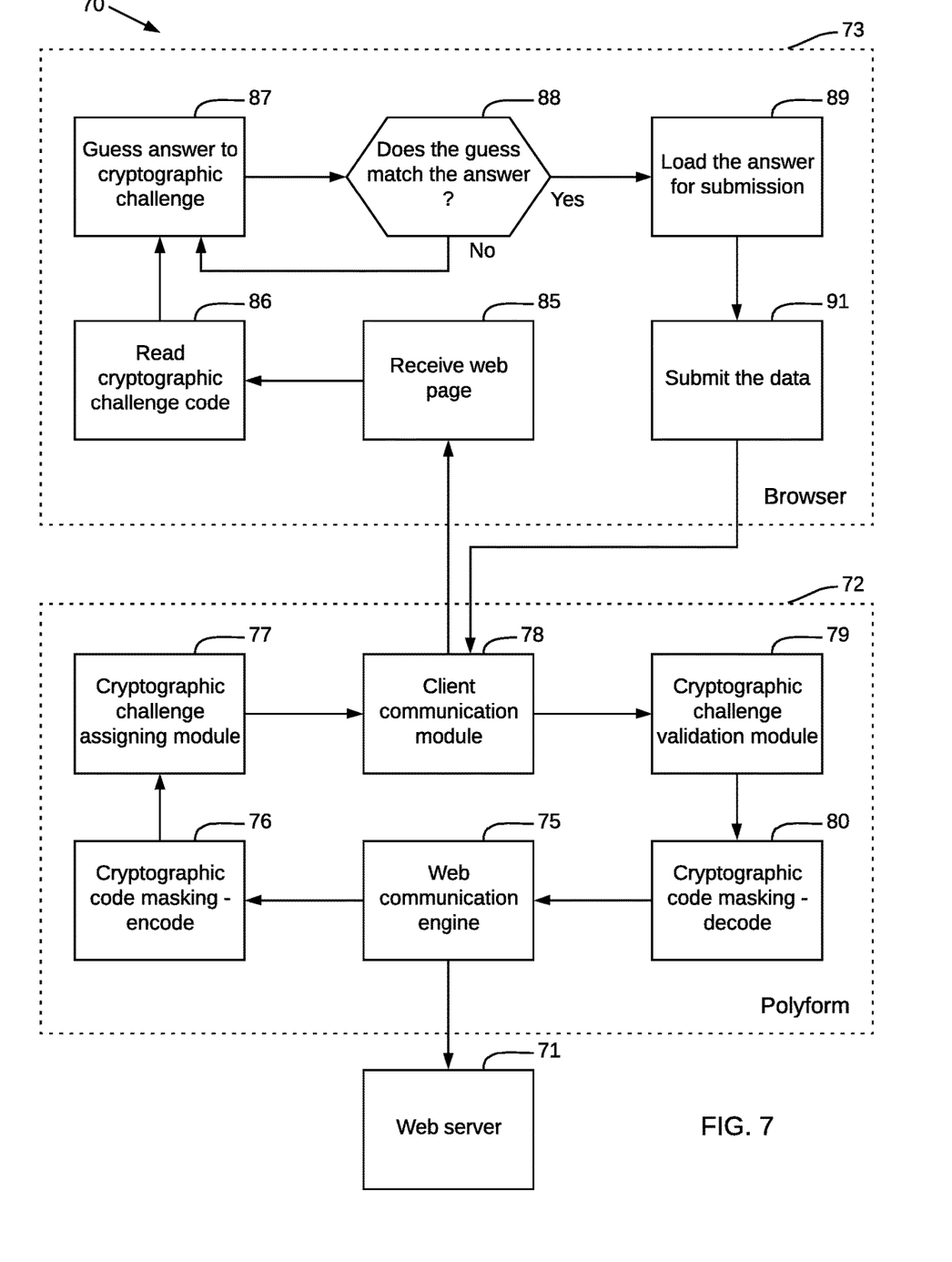
FIG. 7 illustrates an example of a flowchart of an alternative description of an embodiment.

The overall architecture 70 is as illustrated in FIG. 7. This architecture is preferably based around three parts, including one or more Web Servers for receiving and serving web pages 71, one or more proxy severs, such as a Polyform intermediatory 72 for controlling access to the web server 71, and client browser 73.

The example Polyform module 72 is responsible for serving cryptographic challenges. It preferably includes a Web communications module 75, a cryptographic code masking and encoding module 76, a cryptographic assigning module 77, a client communication module 78, a cryptographic challenge validation module 79, and a cryptographic code masking decode module 80.

The example Polyform module 72 is primarily responsible for formulating the cryptographic challenge 76, 77 which may be decoded by a browser. The challenge is preferably dispatched to the browser for solving 78.

The received HTML webpage and/or request is typically received 85 by the browser. The Cryptographic Challenge Code is then attempted to be decoded 86. In order for the cryptographic challenge code to be solved, it is typically necessary for the browser to iterate through a series of guesses to the hash challenge to test a proposed answer 87, 88. If an answer is been determined, the answer may be utilized 89 for decrypting the web page, which can then be loaded with the query data 89 and submitted 91.

Figure 8:
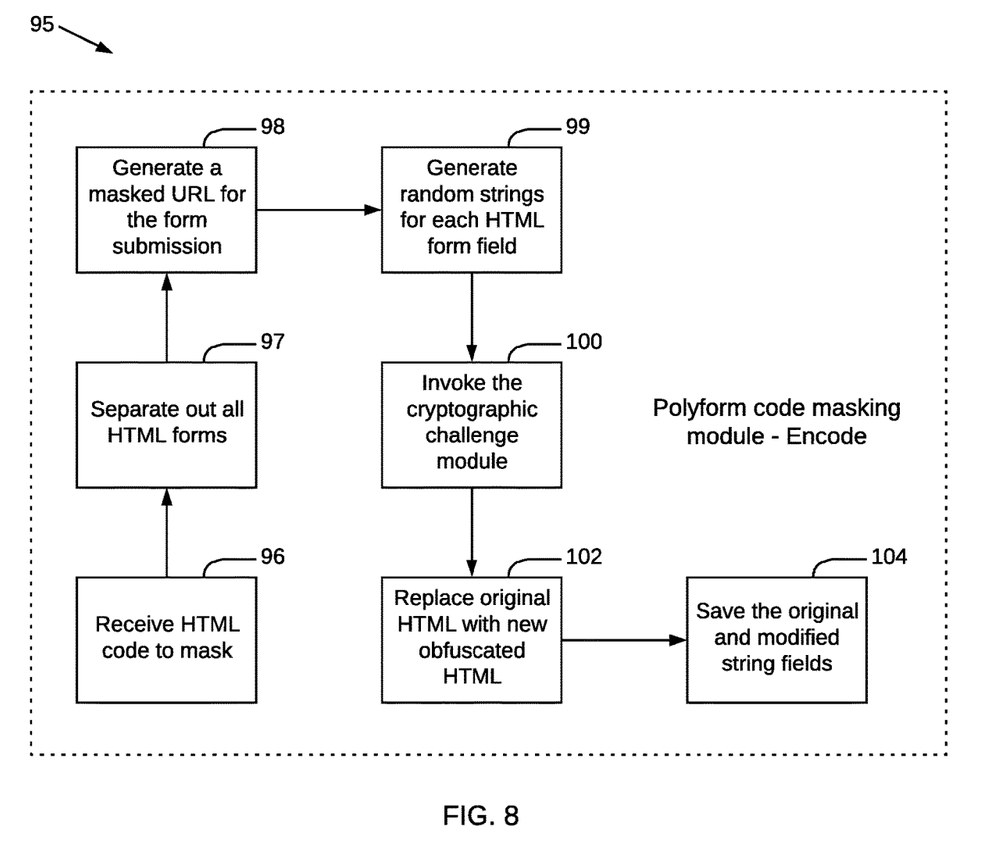
FIG. 8 illustrates an example of a polyform encoding module of FIG. 7.

Turning now to FIG. 8, there is illustrated the encoding unit (steps 76, 77 of FIG. 7) in more detail. The encoding masking module 95 is designed to take static HTML form fields and apply a 'mask' over the original content, thus protecting it from any malicious user. The module performs the following steps:

1. The Masking module receives the raw HTML of the web page it has to mask from the web communication engine 96.

2. The module preferably identifies all of the form fields that are present on the page and separates them out 97.

3. The module then performs masking 98 on the submission URL, this is preferably done by generating a random string and replacing the submission URL.

4. The masking module then preferably takes all of the original identifiers from all of the input fields and replaces them with mote randomly generated strings 5. The Cryptographic Challenge module (77 of FIG. 7) is then invoked 100 and the output of that is applied to the current form.

6. The new, masked HTML for one or more of the forms is used 102 to replace the original content 7. The new content is then sent 102 to the client communication module (78 of FIG. 7) for dispatch to the browser.

8. The modified content may also be saved in a database 104.

Figure 9:
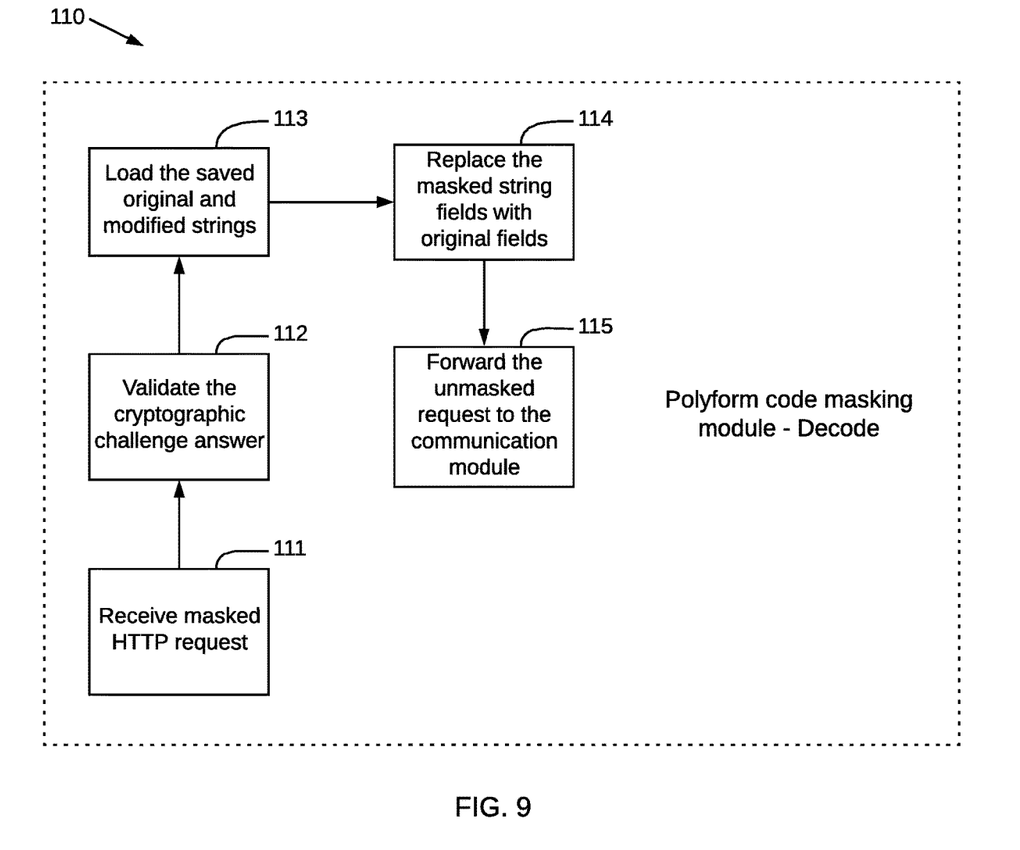
FIG. 9 illustrates an example of a polyform decoding module of FIG. 7.

The Decoding process (79, 80 of FIG. 7) is illustrated in more detail in FIG. 9. The decoding masking module is designed to take the masked input from forms, validate and return it to its original state, protecting a web resource from many different types of web attacks. The decoding module can consist of the following steps:

1. The Masking module receives a masked HTTP request from an end user 111.

2. The cryptographic challenge answer may then be analyzed to determine if it is valid 112. If the answer is not valid, the HTTP request is preferably moved from the masking module to another module (threat mitigation module). If the answer is correct, the HTTP request preferably continues through the current module.

3. The original form content is then loaded from the database 113.

4. All of the masked strings in the HTTP request are changed back to the original, unmasked strings 114.

5. The HTTP request is then forwarded 115 to the web communication engine (75 of FIG. 7) to be sent to the protected web server resource.

Figure 10:
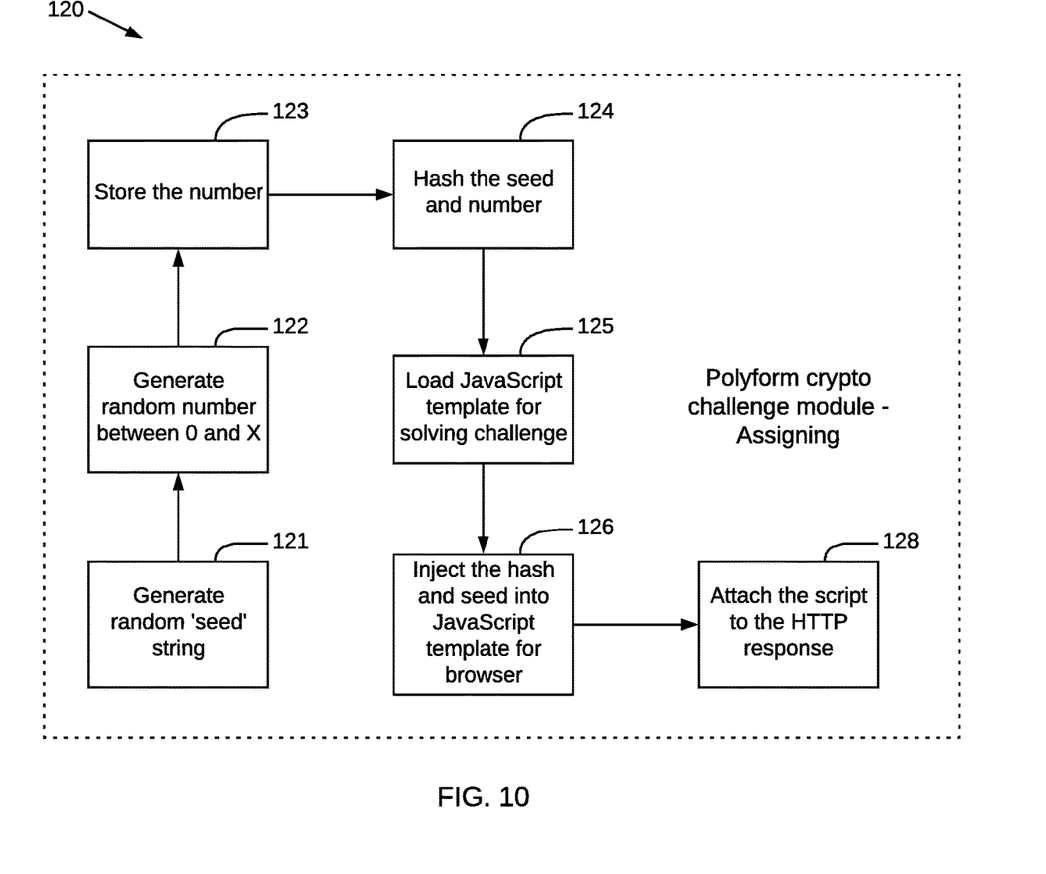
FIG. 10 illustrates an example of a polyform challenge module in more detail.

Turning now to FIG. 10, there is shown the steps 120 involved on the server-side in generating the random challenge for the browser to solve in order to provide the ability to rate limit all HTTP data requests. These steps can include:

1. Generate a random string to act as the seed for this unique, cryptographic challenge 121.

2. Generate a random number between 0 and X to become the secret answer to the challenge 122.

3. Store that number for use in the validation of the challenge 123.

4. Perform a hash on the Secret and the Seed to generate the answer that the browser will use to find the secret 124.

5. The JavaScript template code, or any other suitable code, for solving the cryptographic challenge module is then preferably loaded and the new data is placed into the template 125.

6. The new code is then preferably injected into the HTML response 126 and the script attached to the HTTP response 128.

Figure 11:
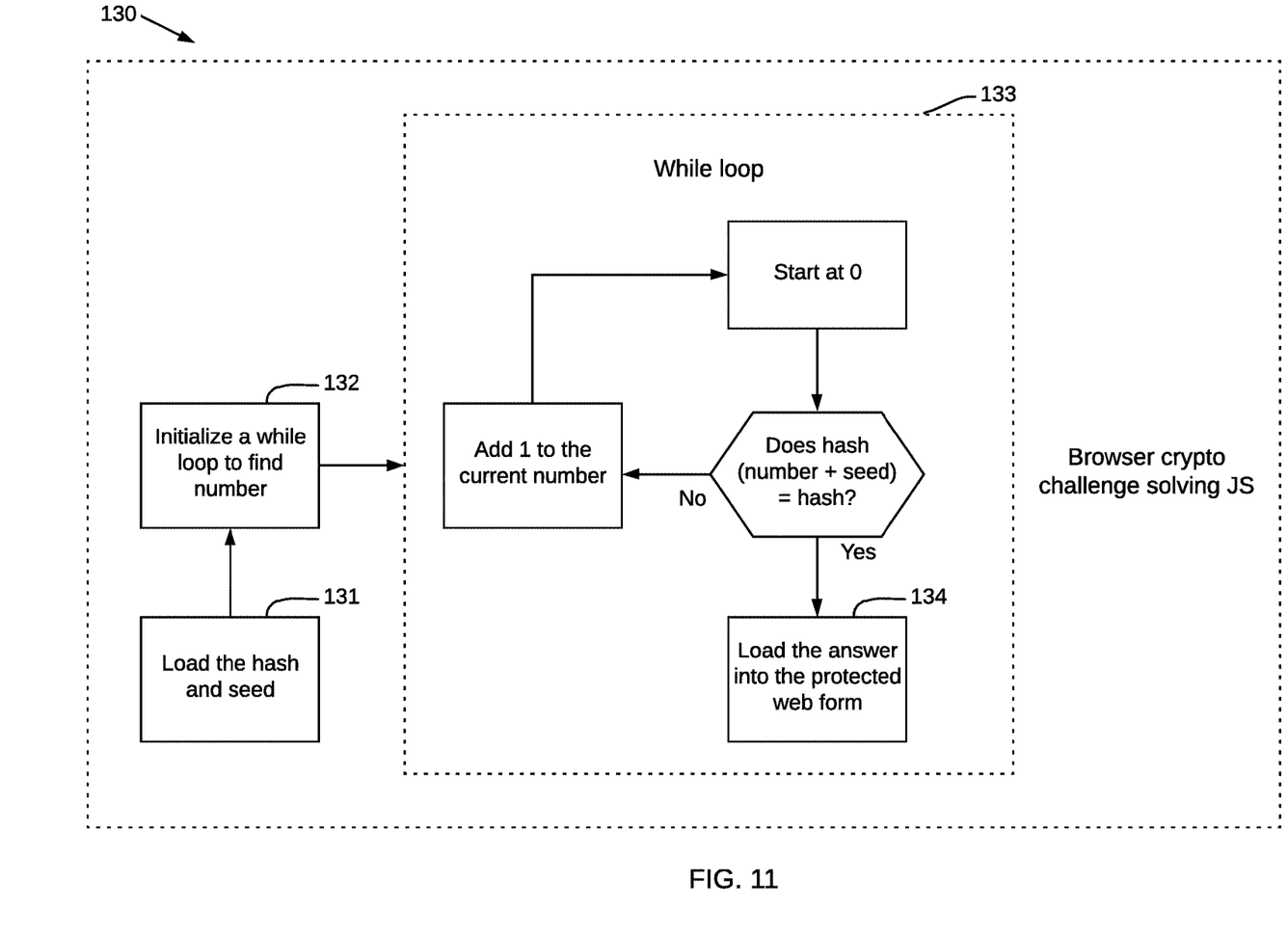
FIG. 11 illustrates an example of a process of challenge solving.

FIG. 11 illustrates the corresponding browser side execution of the injected code 130. In this arrangement, the browser executes the injected challenge code to derive the answer. This piece of code is designed to solve the challenge that the server issues in order to allow it to submit data. The steps involved preferably include:

1. Load the challenge solving script and the answer and seed 131.

2. Start a loop to guess the secret to the challenge 132.

3. The loop 133 can consist of a process of guessing a number, hashing the number and the seed, and comparing the hashed result with the answer. If they do not match, one may be added to the number. If they do match, the number is preferably utilized far loading into the protected web page.

The embodiments of the disclosure therefore provide a system whereby the server can rate limit queries requests by means of imposing a cryptographic hash problem that must be solved by the client before form submission is possible.

Interpretation

The foregoing describes only some forms of an embodiment suitable for use in accordance with the present disclosure. Modifications, to persons of ordinary skill in the art may be made thereto without departing from the scope or spirit of the present disclosure as defined in the following claims.

Reference throughout this specification to "one embodiment", "some embodiments" or "an embodiment" means that a particular feature, structure or characteristic described in connection with the embodiment may be included in at least one embodiment. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below, and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including, or which includes or that includes as used herein, is an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not necessarily intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or optical contact, or that two or more elements are not in direct contact with each other hut yet still co-operate or interact with each other.

Thus, while there has been described what are believed to be the preferred embodiments of the invention, those skilled in the art will recognize that other and further modifications may be made thereto without departing from the spirit and scope of the disclosure, and it is intended to claim all such changes and modifications as filling within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure. And, the steps may be performed in any suitable order.

I claim:

1. A method of enhancing the security of an internet server, the method including:
   receiving a request at the internet server for web form data from a client device via a network;
   determining a hash based on a number and a seed at the internet server, wherein the complexity of the hash is altered in accordance with a calculated level of risk of insecurity of the network;
   sending, from the internet server to the client device, a response to the request, the response including the hash and the seed;
   receiving, at the internet server, a browser determined answer that is based on the hash and the seed; and
   sending the web form data, from the internet server to the client device, if the browser determined answer matches the number.

2. A method as claimed in claim 1 wherein the number is a randomly generated number.

* * * * *